US008475908B2

(12) United States Patent
Sauter et al.

(10) Patent No.: US 8,475,908 B2
(45) Date of Patent: Jul. 2, 2013

(54) 3D EMBOSSING

(75) Inventors: Jurgen Sauter, Mannheim (DE); Philippe Albouze, Aveze (FR)

(73) Assignee: SCA Hygiene Products GmbH, Mannheim (DE)

( * ) Notice: Subject to any disclaimer, the term of this patent is extended or adjusted under 35 U.S.C. 154(b) by 624 days.

(21) Appl. No.: 12/669,226

(22) PCT Filed: Jul. 17, 2007

(86) PCT No.: PCT/EP2007/057376
§ 371 (c)(1),
(2), (4) Date: Jan. 15, 2010

(87) PCT Pub. No.: WO2009/010092
PCT Pub. Date: Jan. 22, 2009

(65) Prior Publication Data

US 2010/0183850 A1 Jul. 22, 2010

(51) Int. Cl.
*B32B 3/10* (2006.01)
*B31F 1/07* (2006.01)

(52) U.S. Cl.
USPC ........... 428/172; 428/166; 428/174; 162/109; 162/113

(58) Field of Classification Search
USPC .. 428/152, 153, 154, 166, 172, 174; 162/109, 162/113
See application file for complete search history.

(56) References Cited

U.S. PATENT DOCUMENTS 3,867,225 A * 2/1975 Nystrand ...................... 156/209
5,294,475 A 3/1994 McNeil
6,173,496 B1 1/2001 Makoui et al.
6,440,564 B1 8/2002 McLain et al.
2005/0138981 A1 6/2005 Wilhelm
2006/0286885 A1 12/2006 Schuh et al.
2007/0122595 A1 5/2007 Basler et al.

FOREIGN PATENT DOCUMENTS

| | | | |
|---|---|---|---|
| DE | 197 34 414 | A1 | 2/1999 |
| DE | 202004011289 | U | 11/2004 |
| GB | 2 376 436 | A | 12/2002 |
| WO | WO 01/38078 | A1 | 5/2001 |
| WO | WO 03/057461 | A1 | 7/2003 |
| WO | WO 2005/033408 | A2 | 4/2005 |

OTHER PUBLICATIONS

International Search Report, dated Jun. 26, 2008, from corresponding PCT application.

* cited by examiner

*Primary Examiner* — Donald J Loney
(74) *Attorney, Agent, or Firm* — Buchanan Ingersoll & Rooney

(57) ABSTRACT

An embossing roll for producing fibrous products, has a structurized embossing surface suitable to run against an anvil roll. The structurized embossing surface includes male protrusions or female depressions starting from a base circumferential surface of the roll. The embossing pattern is characterized by the following features:

- the base areas of selected male protrusions or female depressions in the base circumferential surface are different;
- the heights or depths of selected male protrusions or selected female depressions in a radial direction of the roll and starting from the base circumferential surface are different; and
- the angles between sidewall sections and the adjacent base circumferential surface of selected male protrusions and/or female depressions are different.

8 Claims, 13 Drawing Sheets

3D EMBOSSING

FIELD OF THE INVENTION

The invention relates to an embossing roll for producing fibrous products, especially tissue paper products, non-woven products or a hybrid thereof and preferably hygiene and cleaning products. The invention also relates to a device for producing such fibrous product, a method for producing a multi-ply fibrous product and a fibrous product.

BACKGROUND OF THE INVENTION AND PRIOR ART

Hygiene or wiping products primarily include all kinds of dry-creped tissue paper, wet-creped paper, TAD-paper (Through Air Drying) and cellulose or pulp-wadding or all kinds of non-wovens, or combinations, laminates or mixtures thereof. Typical properties of these hygiene and wiping products include the reliability to absorb tensile stress energy, their drapability, good textile-like flexibility, properties which are frequently referred to as bulk softness, a higher surface softness and a high specific volume with a perceptible thickness. A liquid absorbency as high as possible and, depending on the application, a suitable wet and dry strength as well as an appealable visual appearance of the outer product's surface are desired. These properties, among others, allow these hygiene and wiping products to be used, for example, as cleaning wipes such as paper or non-woven wipes, windscreen cleaning wipes, industrial wipes, kitchen paper or the like; as sanitary products such as for example bathroom tissue, paper or non-woven handkerchiefs, household towels, towels and the like; as cosmetic wipes such as for example facials and as serviettes or napkins, just to mention some of the products that can be used. Furthermore, the hygiene and wiping products can be dry, moist, wet, printed or pretreated in any manner. In addition, the hygiene and wiping products may be folded, interleaved or individually placed, stacked or rolled, connected or not, in any suitable manner.

Due to the above description, the products can be used for personal and household use as well as commercial and industrial use. They are adapted to absorb fluids, remove dust, for decorative purposes, for wrapping or even just as supporting material, as is common for example in medical practices or in hospitals.

If tissue paper is to be made out of pulp, the process essentially comprises a forming that includes a box and a forming wire portion, and a drying portion (either through air drying or conventional drying on a yankee cylinder). The production process also usually includes the crepe process essential for tissues and, finally, typically a monitoring and winding area.

Paper can be formed by placing the fibers, in an oriented or random manner, on one or between two continuously revolving wires of a paper making machine while simultaneously removing the main quantity of water of dilution until dry-solids contents of usually between 12 and 35% are obtained.

Drying the formed primary fibrous web occurs in one or more steps by mechanical and thermal means until a final dry-solids content of usually about 93 to 97% has been reached. In case of tissue making, this stage is followed by the crepe process which crucially influences the properties of the finished tissue product in conventional processes. The conventional dry crepe process involves creping on a usually 4.0 to 6.5 m diameter drying cylinder, the so-called yankee cylinder, by means of a crepe doctor with the aforementioned final dry-solids content of the raw tissue paper. Wet creping can be used as well, if lower demands are made of the tissue quality. The creped, finally dry raw tissue paper, the so-called base tissue, is then available for further processing into the paper product for a tissue paper product.

Instead of the conventional tissue making process described above, the use of a modified technique is possible in which an improvement in specific volume is achieved by a special kind of drying which leads to an improvement in the bulk softness of the tissue paper. This process, which exists in a variety of subtypes, is termed the TAD (Through Air Drying) technique. It is characterized by the fact that the "primary" fibrous web that leaves the forming and sheet making stage is pre-dried to a dry-solids content of about 80% before final contact drying on the yankee cylinder by blowing hot air through the fibrous web. The fibrous web is supported by an air-permeable wire or belt or TAD-fabric and during its transport is guided over the surface of an air-permeable rotating cylinder drum, the so-called TAD-cylinder. Structuring the supporting wire or belt makes it possible to produce any pattern of compressed zones broken up by deformation in the moist state, also named moulding, resulting in increased mean specific volumes and consequently leading to an increase of bulk softness without decisively decreasing the strength of the fibrous web.

To produce multi-ply tissue paper products, such as handkerchiefs, bathroom paper, towels or household towels, an intermediate step often occurs with so-called doubling in which the base tissue in the desired number of plies of a finished product is usually gathered on a common multi-ply mother reel.

The processing step from the base tissue that has already been optionally wound up in several plies to the finished tissue product occurs in processing machines (converting machines) which include operations such as unwinding the base tissue, repeated smoothing of the tissue, printing embossing, to an extent combined with full area and/or local application of adhesive to produce ply adhesion of the individual plies to be combined together as well as longitudinal cut, folding, cross cut, placement and bringing together a plurality of individual tissues and their packaging as well as bringing them together to form larger surrounding packaging or bundles. Such processing steps may also include application of substances like scents, lotions, softeners or other chemical additives. The individual paper ply webs can also be pre-embossed and then combined in a roll gap according to the embossing methods known in the art. Any embossing can lead to embossed elements all having the same height or to embossing elements having different heights. Plybonding, e.g. by mechanical or by chemical means are other well-known methods mainly used for hankies, napkins and bathroom tissues.

A well-known technique to increase the thickness of a paper product is to emboss the paper web. An embossing process is carried out in the nip between an embossing roll and an anvil roll. The embossing roll can have protrusions on its circumferential surface leading to so-called embossed depressions in the paper web or it can have depressions in its circumferential surface leading to so-called embossed protrusions in the paper web.

Anvil rolls may be softer than the corresponding embossing roll and may consist of rubber, such as natural rubber, or plastic materials, paper or steel.

For manufacturing multi-ply tissue products, especially bathroom tissue and household tissue, three manufacturing methods for embossing and adhesively bonding of the plies have established. These are Goffra Incolla/spot embossing, DESL (Double Embossing Single Lamination)/Nested, and Pin-to-Pin/Foot-to-Foot.

In the first mentioned manufacturing method, Goffra Incolla, a first web is directed through the nip between an embossing roll and an anvil roll. In this nip the web is provided with an embossing pattern. Thereafter, an application roll for adhesive applies adhesive to those parts of the first web at which there are protruding embossing elements in the embossing roll. The adhesive is transported from an adhesive bath via an adhesive transfer roll to the application roll. A second web is transported to the first web and adhesively bonded to the first web in the nip between the so-called marrying roll and the embossing roll. The adhesive bonding takes place at those portions at which the adhesive was applied.

The second manufacturing method (DESL/Nested) is very similar to the above-described Goffra Incolla method. It comprises an additional pair of rolls consisting of a second embossing roll and a second anvil roll. The additional pair of rolls serves to emboss the second web before it is adhesively bonded to the first web using the marrying roll. Typically, the additional pair of rolls is placed close to the first pair of rolls and the marrying roll. Especially when using the so-called Nested-method such close arrangement is important. The Nested-method can be considered as a special case of the general DESL-manufacturing method. For the Nested-method the embossing elements of the first embossing roll and the embossing elements of the second embossing roll are arranged such that the embossed elements of the first embossed ply and the embossed elements of the second embossed ply fit into each other similar to a gearing system. This serves to achieve a mutual stabilization of the two plies. However, for the DESL manufacturing method such correlation between the embossed elements of the first, upper ply and the second, lower ply, does not have to apply. Nevertheless, in a literature the term DESL is often used synonymous to a Nested-method.

The third manufacturing method (Pin-to-Pin/Foot-to-Foot) is similar to the DESL method. By means of two pairs of rolls both the upper ply and the lower ply are embossed, respectively. Adhesive is applied onto the embossed protrusions of the first ply. The ply bonding however, is not achieved by means of a marrying roll as in the DESL method but is achieved directly by means of the protruding embossing elements of the second embossing roll. In order to achieve this, an exact adjustment of the width of the nip between the first embossing roll and the second embossing roll is required, which is mainly defined by the individual thickness of both webs (upper ply and lower ply). Further, the embossing rolls have to be designed such that the protruding embossing elements of both rolls face each other. This is the reason why the terminology Pin-to-Pin or Foot-to-Foot embossing is used.

All above described methods have the following common features: the first embossing roll is formed of a hard material, usually metal, especially steel, but there are also known embossing rolls made of hard rubber or hard plastics materials. The embossing rolls can be a male roll having individual protrusions. Alternatively, the embossing roll can be a female roll with individual embossing depressions. Typical depths of the engraved embossing patterns are between 0.4 and 2.0 mm.

The anvil roll typically has a rubber coating with a hardness between 35 Shore A and 85 Shore A. However, structurized anvil rolls, especially rolls made of paper, rubber or plastics materials or steel are also known.

The applicator roll for adhesive is usually also a rubber roll with a plain smooth circumferential surface, wherein the hardness of the rubber coating is between the hardness of the anvil roll and the hardness of the marrying roll. Commonly used values for the hardness of the rubber coating are 70 to 85 Shore A. When selecting the rubber material its compatibility with the adhesive to be applied has to be ensured.

The application system for adhesive consisting of applicator roll, adhesive transfer roll and adhesive bath can be designed as a so-called immersion roll system in which the adhesive transfer roll is immersed into the adhesive bath and transports adhesive by means of surface tension and adhesive forces out of the adhesive bath. By adjusting the gap between the adhesive transfer roll and the applicator or application roll, the amount of adhesive to be applied can be adjusted. Application rolls may be structured rolls. Recently, adhesive transfer rolls have become known having defined pit-shaped depressions in their circumferential surface. Such adhesive transfer rolls are known as Anilox-rolls. Such roll is usually made of ceramic material or it is a roll made of steel or copper and coated with chromium. Excessive adhesive is removed from the surface of the Anilox-roll by means of a blade. The amount of adhesive is determined by the volume and the number of depressions. Alternative application systems for applying adhesives are based on a spraying equipment (Weko-technique).

A second possibility to influence the amount of adhesive transferred is the adjustment of the difference in circumferential speeds of the adhesive transfer roll and the applicator roll. Typically, the adhesive transfer roll rotates slower than the applicator roll. The circumferential speed of the adhesive transfer roll is usually between 5% and 100% of the first circumferential speed of the applicator roll. The adhesive bath can be designed as a simple trough, application systems with a blade can also be designed as chamber systems.

The embossing technologies Goffra Incolla/spot embossing and DESL/Nested, both use an additional roll, the so-called marrying roll for laminating together the plies. The marrying roll commonly has a smooth rubber surface with a hardness of about 90-95 Shore A. A suitable material is e.g. NBR (acrylonitrile-butadiene rubber). However, marrying rolls also have become known which, in addition to the rubber coating, are provided with a steel coating. Such steel coating is often provided in form of a steel band spirally wound onto the rubber coating.

In case that the single layers individually or together are pre-embossed, a so-called micro-pre-embossing device is used. Such pre-embossing device is often used in combination with the Goffra Incolla technology. Also commonly used is a printing onto the tissue product before or after the ply bonding step. Also known are variants including the application of chemical substances, especially lotions and softeners.

Another well-known embossing technique comprises a steel embossing roll and a corresponding anvil steel roll (so-called Union embossing). The surfaces of these rolls are being formed in such a manner that deformation of the paper and mechanical plybonding without using adhesives are achieved within one single embossing step.

When using all of the above described three embossing methods it is advantageous to provide a control for the tension of the web both before and after the ply bonding because the physical properties of the web and especially the stress-strain characteristic can be changed significantly in the embossing step.

FIG. 11*a* depicts part of the circumferential surface of an embossing roll 100 having discrete protrusions 102 leading, when cooperating in the above described way with a yieldable anvil roller, to a product as shown in FIG. 11*b*. Such paper product 110 has a main portion lying in a base plane 112 from which embossing depressions 114 project. In the prior art example as shown in FIGS. 11*a*, 11*b*, the embossing roll has male embossing elements 102 all of which have the same height and geometry. However, a so-called double height embossing is also known in the prior art. To exemplify this, FIG. 12*a* shows part of the outer circumferential surface of an embossing roller 120 with two different types of male embossing protrusions. These are protrusions 122 having a higher height as well as protrusions 124 with a smaller height. Otherwise, in the example according to FIG. 12*a*, the protrusions have a similar cross-sectional geometry. However, it is also known in the art to combine embossing protrusions of different geometry and different height together. Such an embossing technique is known from EP 0 797 705 A1.

The resulting paper product 130 is schematically shown in FIG. 12*b*. Starting from a base plane 132, the paper product has embossing depressions 134 with a larger depth as well as embossing depressions 136 being smaller in size.

The embossing rolls used in the prior art are mainly manufactured using the so-called moletage technique which is a roll engraving by means of a cold forming of the steel of the embossing roll. According to such moletage technique, usually several cold forming steps and several etching steps have to be carried out. This known production technique places some limitations on the shape of the protrusions in the surface of the roll. The slope angle has an impact on the mechanical stability of the paper product produced with such an embossing roll. If the slope angle is smaller, the product has a smaller local stability around the embossed structure because locally the fiber structure is destroyed to a larger extent. Therefore, for reasons of a sufficient mechanical stability of the paper product and of the constraint put upon the manufacture of protrusions on the surface of the roll using the moletage technique, a slope angle of at least 23° is commonly used in the art.

Another engraving technology for manufacturing embossing rolls for the tissue and hygiene industry is etching. Within a first step, a mask is applied on the circumferential surface of the embossing roll followed by a second step in which the surface is etched by applying acid at those areas where no mask has been applied. The result is a circumferential surface of the roll which is partly engraved, wherein the transition between engraved areas and non-engraved areas has a step angle of 0° up to 10°. In other words, the etching technique leads to a step-like surface structure. The method steps of masking and etching with the same or different geometries of masks can be repeated several times. By using a repeated etching technique, a surface structure can be achieved which is similar to discrete stairs which extend from the original circumferential surface of the roll into the material of the roll.

A further technique for manufacturing embossing rolls for the tissue and hygiene industry is CNC milling. This technique is often used for simpler rectangular elements, for example truncated pyramids. The angle of the embossing elements and the radial direction of the embossing roll can be easily varied in a wide range if such angle is the same for all embossing elements.

Another technique predominantly used for rolls made of plastics material, like rubber rolls, is the use of a laser ablation technique. Laser techniques are used for rolls made of plastic material as well as for steel rolls. Other manufacturing methods for embossing rolls are manually engraving techniques or galvanoforming. In principle a combination of such techniques can be used for manufacturing embossing rolls. One preferred manufacturing process is based on masking/etching technology in combination with moletage (knurling). Another well-known combination of engraving techniques is a multi-step etching technique with at least five, preferably around 10 separate etching steps, and the final rounding of the resulting steps in order to achieve a smooth shape of the embossing elements produced. Useful rounding steps are brushing with metal brushes, short overall etching or blast treatment with hard particles, such as glass, sand or corundum.

The embossing not only serves to provide bulk to the fibrous product but also to provide an improved optical appearance to the product. The optical appearance of a product is important for consumer products and also serves to provide a higher degree of recognition to the product. The optical appearance can be improved by combining embossing and coloring steps. Another reason for embossing is to generate higher absorbency or improved perceived softness.

SUMMARY OF THE INVENTION

It is the object of the invention to provide an embossing roll, a fibrous product, as well as a device and method comprising such embossing roll for producing such fibrous product with a new embossing technology in order to increase the versatility of possible optical appearances of the product.

According to the invention, an embossing roll for producing fibrous products, especially tissue paper products, nonwoven products or a hybrid thereof, and preferably hygiene and cleaning products, comprises a structurized embossing surface suitable to run against an anvil roll wherein the structurized embossing surface comprises male protrusions or female depressions starting from a base circumferential surface of the roll. The embossing pattern is characterized by the following characteristics:

- the base areas of selected male protrusions or female depressions in the base surface are different;
- the heights of selected male protrusions or the depths of selected female depressions in a radial direction of the roll and starting from the base circumferential surface are different; and
- the angles between side wall sections and the adjacent base circumferential surface of selected male protrusions and/or female depressions are different.

Male protrusions of the embossing roll translate into embossed depressions in the product, like depressed dots, while female depressions in the roll lead to embossed protrusions in the fibrous product, especially cushion-like shapes. Ideally, the correlation between the inventive embossing roll and the fibrous product achieved from using such embossing roll in a device comprising such roll and a cooperating anvil roll leads to a mirror image of the fibrous product as compared to the inventive embossing roll. However, there is actually a loss which occurs in the production process. Such loss can be attributed to the fact that the fibrous product as processed is visco-elastic, i.e. during embossing, there is a certain part of the deformation which is elastic. Therefore, after the embossing step, there is some spring back behaviour of the fibrous product so that the geometry of the embossing roll does not generate an embossed product which is the mirror image of the roll. The degree of loss depends on the material of the fibrous product, the characteristics of the embossing roll and anvil roll and many other factors, but mainly depends on the geometry of the embossing pattern provided on the circumferential surface of the embossing roll.

The fibrous product according to the invention is especially a tissue paper product, non-woven product or a hybrid thereof, and preferably a hygiene and cleaning product. It has at least one ply with an embossing pattern comprising embossed depressions, like depressed dots, or embossed protrusions, like cushion-like shapes, the embossed depressions or embossed protrusions starting from a base plane of the ply. The embossing pattern is characterized by the same basic characteristics as can be found in the embossing roll, however, in the inverse pattern of the product and with the above-discussed loss:

- the base areas of selected embossed elements, in particular embossed depressions or embossed protrusions, in the base plane are different;
- the depths of selected embossed depressions or the heights of selected embossed protrusions perpendicular to the base plane are different; and
- the angles between side wall sections and the adjacent base plane of selected embossed depressions or embossed protrusions are different.

The term non-woven according to ISO 9092, DIN EN 29092 is applied to a wide range of products which, in terms of their properties are located between those of paper (DIN 6730, May 1996) and cardboard (DIN 6730) on the one hand, and textiles on the other hand. As regards non-woven a large number of extremely varied production processes are used, such as the air-laid and spun-laced techniques as well as the wet-laid techniques. The non-wovens include mats, non-woven fabrics and finished products made thereof. Non-wovens may also be called textile-like composite materials, which represent flexible porous fabrics that are not produced via the classic methods of weaving warp and weft or by looping. In fact, non-wovens are produced by intertwining, cohesive or adhesive bonding of fibers, or a combination thereof. The non-woven material can be formed of natural fibers, such as cellulose or cotton fibers, but can also consist of synthetic fibers such as polyethylene (PE), polypropylene (PP), polyurethane (PU), polyester, fibers on the basis of polyethylenterephtalate, polyvinyl alcohol, nylon or regenerated cellulose or a mix of different fibers. The fibers may, for example, be present in the form of endless fibers or pre-fabricated fibers of a finite length, as synthetic fibers, or in the form of staple fibers. The non-wovens as mentioned herein may thus consist of mixtures of synthetic and cellulose fibrous material, e.g. natural vegetable fibers (see ISO 9092, DIN EN 29092).

The term "hygiene products" and "cleaning products" as used herein comprise bathroom tissue, household towels, handkerchiefs, facial tissues, napkins, wiping and cleaning products as well table ware. It does not comprise wall paper products.

The fibrous product according to the invention is highly variable in terms of the shape of the embossing pattern. The embossing pattern can be both embossing protrusions or embossed depressions as explained above. The embossing pattern is a freely shaped 3-dimensional geometry. This means that there are no more standardized geometries of the embossed protrusions or depressions or, at least, there are no more groups of embossed protrusions or embossed depressions all having the same shape. This easy requirement that not all embossed depressions (in case of male embossing protrusions on the embossing roll) or embossed protrusions (in case of female embossing depressions on the embossing roll) are the same, leads to the above listed characteristics of the paper product.

Depending on whether the embossing roll has male protrusions or female depressions on its circumferential surface, a base plane comparable to the base plane 112 and 132 in the prior art examples according to FIG. 11*b* and FIG. 12*b* can be defined.

According to the invention, a freely designed three dimensional surface structure of the embossing roll translates into the claimed fibrous product. However, as outlined above all embossing processes have a loss, so that the embossed product does not assume the exact mirror image form of the embossing roll. This loss leads to angles in the embossed elements of the product which are not as steep as the corresponding angles on the embossing roll. This general observation is also valid for the inventive 3-dimensional embossing which has to be accounted for when designing a suitable embossing roll to produce the inventive fibrous product. The deviation of the embossing pattern in the product relative to embossing pattern in the roll depends on the material properties of the paper product, the hardness of the anvil roll cooperating with the embossing roll, the line pressure during the embossing process, and the relation of depths, widths or slope angles of a specific embossing element.

The device for producing fibrous products with at least one ply, especially tissue paper products, non-woven products or a hybrid thereof, and preferably hygiene and cleaning products, comprises an inventive embossing roll as well as a cooperating anvil roll. The structurized embossing roll has a three dimensional surface with embossing elements in form of male protrusions or female depressions, the angles and heights/depths of selected embossing elements being different. In other words, the inventive embossing roll is the core of a device for producing fibrous products according to the invention. Reference to selected embossing elements serves to clearly state that not all embossing elements must have a different geometry. For practical reasons, this is not possible because an embossing roll usually has a repeating pattern on its outer circumferential surface so that, at least within each of the repeating design sections, corresponding embossing elements will be identical. However, it is also possible that within one single design pattern translating into one sheet of bathroom tissue or one sheet of household towel, a plurality of individual embossing elements might be identical in shape. Therefore, the above given reference to selected embossing elements being different intends to define that the inventive roll, the inventive product as well as the inventive device using such roll provide a wide variety of different geometries in terms of size, height/depth, slope angle and overall shape of individual embossing elements.

The inventive method for producing a multi-ply fibrous product, especially tissue paper product, non-woven product or a hybrid thereof and preferably hygiene and cleaning product comprises the method steps of embossing a top ply using an embossing roll according to the invention, supplying at least one further ply, and bonding together the top ply and the further ply in the nip between the embossing roll and a marrying roll or in the nip between the embossing roll and a second embossing roll for embossing the further ply. Such method provides the inventive three dimensional fibrous product.

Preferably the embossing roll according to the invention is characterized by angles $\beta_1$, $\beta_2$ being defined as the crossing of the orthogonal of male protrusions or female depressions direction ($O_1$, $O_2$) starting from a selected position on the local surface of male protrusions or female depressions and the base circumferential surface whereby such angles $\beta_1$, $\beta_2$ should be either larger than 30°, preferably larger than 50° or such angles $\beta_1$, $\beta_2$ should be smaller than 20°.

According to a preferred embodiment, the embossing roll is shaped such that the local surface of at least one female depression is curved such that two orthogonal directions starting from selected positions on the curved local surface can be defined, the two orthogonal directions crossing the base circumferential surface at angles $\beta_1$, $\beta_2$ satisfying the equation $30° < |\beta_1 - \beta_2| 90°$ and preferably $50° < |\beta_1 - \beta_2| < 90°$.

Such an embossing roll provides a high range of possible surface geometries, including curved depressions. According to the prior art, standard embossing protrusions might also have very small rounded portions at their edges in the range of 0.1 mm. Such rounded portions are not covered by the above feature according to which female depressions are curved. What is meant by this is a curved surface which by far exceeds locally arranged rounded edges as known from embossing protrusions in the prior art.

Preferably, the structurized embossing surface is a freely shaped three-dimensional surface. What is meant by freely shaped dimensional surface is a surface structure which is not a conventional embossing protrusion or embossing depression with a base surface, top surface and a fixed slope angle. Conventional elements are any embossing elements which are truncated cones or pyramids with polygonal or round or oval base areas, cylinders with polygonal or round or oval base areas, linear elements with fixed slope angle, elements with a base area which is circular, elliptical, or a regular polygon with curved side surfaces. Such conventional embossing elements typically have a maximum extension in the base plane not exceeding 4 millimeters. All such conventional elements are not covered by the above term of a “freely shaped three-dimensional surface”.

According to a preferred embodiment, at least one male protrusion or female depression has a lateral extension which exceeds 4 mm, preferably exceeds 10 mm and most preferably exceeds 25 mm. In other words, the structurized embossing surface of the inventive embossing roll has at least one embossing element which has an extension exceeding that of a conventional element which usually has a maximum extension in the base plane smaller than 4 mm.

Preferably the male protrusions or the female depressions are being characterized by a height for the male protrusions or a depth for the female depressions of at least 0.4 mm, especially of at least 0.9 mm. The maximum height for the male protrusions and the maximum depth of the female depressions should not exceed 2.0 mm, especially 1.0 mm.

According to a preferred embodiment, at least one male protrusion or female depression has side walls with at least two different slope angles between side wall sections and the adjacent base surface sections. This serves as a further characteristic feature of the inventive embossing pattern on the embossing roll. Any conventions as regards shape, regularity including slope angles and overall shape of the embossing elements are left.

Preferably, at least one female depression is an elongate groove, the depth of which continuously changes in at least a section of the groove in longitudinal direction of the groove. This again is a further characteristic feature which contributes to a very high variety of possible geometries and shapes of the embossing elements of the inventive embossing roll. In addition to this, at least one female depression being an elongated groove can preferably have a width which continuously changes in longitudinal direction of the groove in at least a section of the groove. This characteristic feature, especially in combination with the above discussed changing depths of an elongate groove, leads to a very high variability of possible shapes of embossed protrusions in the product which follows from the elongate depressions in the inventive embossing roll.

According to a preferred embodiment, the embossing roll has at least two female depressions, the two female depressions having a different ratio between maximum depths in a radial direction, starting from the base circumferential surface, and the opening area in the base circumferential surface. To provide such differing opening ratios further increases the options to provide recognizably different geometries for individual embossed protrusions. However, it should be mentioned that there are technical constraints with regard to the free selection of the opening ratio because, depending on the material properties of the fibrous product, the production device and the process conditions, the fibrous product to be processed will only be able to adopt the shape of such embossing protrusions or embossing depressions which it will be able to follow in shape. Nevertheless, a variation of the opening ratio opens a further possibilities towards a freely selected three dimensions shape leaving standardized properties and geometries of conventional embossing protrusions.

According to a further preferred embodiment of the invention, the roll has at least one further base circumferential surface from which selected male protrusions or female depressions start or at which they terminate. In other words, the embossed geometries (male embossed protrusions or female embossed depressions) need not necessarily start from the same base circumferential surface of the embossing roll. Instead, the freely shaped three-dimensional geometry might have e.g. large female depressions which are internally structured by intermediate sections of lower depths which subdivide one big female depression into a plurality of individual sub-units. An example of such an inventive embossing roll in which two different base planes might be defined will be given below with reference to a preferred embodiment.

According to a preferred embodiment, at least one male protrusion is an elongate rib, the height of which continuously changes in at least a section of the rib in longitudinal direction of the rib.

According to a further preferred embodiment of the invention, at least one male protrusion is an elongate rib, the width of which continuously changes in a longitudinal direction of the rib in at least a section of the rib. Both above characteristics, which can be realized separately or in combination in each male protrusion being an elongate rib, further serve to increase the variability of possible shapes and optical appearances of the fibrous product embossed with such an embossing roll.

According to a preferred embodiment of the invention, selected angles between side wall sections of male protrusions or female depressions and the adjacent base circumferential surface exceed 30°. The use of a wide variety of such slope angles opens up the option to provide a higher variety of angles within either one single embossing element (male protrusion or female depression) or to provide more visible differences between different embossing elements.

Preferably, the embossing roll is made of metal, especially steel, or hard plastics materials or hard rubber. In case of plastics, a very hard plastics material is preferred, alternatively a resin material is also possible.

Preferably, the embossing surface is formed by master-etching and/or moletage processing. The masking process is often performed with a wax jet or with a laser partly ablating the mask. Such processing techniques are able to lead to a high variety of surface geometries, wherein the moletage processing is mainly used in combination with an etching technique which is applied where the metal after the moletage step was deformed most.

Alternatively, the embossing surface of the inventive embossing roll can also be formed by mechanical machining, especially milling, which, however, can also be carried out in addition to masking etching and/or moletage processing. With these production technologies at hand, it is possible to freely shape the embossing surface of the embossing roll so that the limits imposed to a free shape of the embossing roll is not the geometry of the roll itself but the use of a shape which the inventive fibrous product still can substantially follow in the course of the embossing process.

A preferred embodiment of the inventive method for producing a multi-ply fibrous product is the bonding together the top ply and the further ply by means of a mechanical ply bonding. Such mechanical ply bonding which, for example, can be carried out by means of an edge embossing technique and/or by knurling, can either be carried out without the use of an adhesive or in additional to the application of adhesive. If a mechanical ply bonding is used without adhesive, the resulting product can retain a high degree of softness because the plies are only interconnected where a mechanical ply bonding was carried out. In case of a mechanical ply bonding in addition to laminating together the top ply and the further ply by means of adhesive, any desired combination of ply bonding and a variation of the characteristic properties of the multi-ply product as influenced by adhesive bonding can be freely selected.

For laminating together the single webs of material, different types of adhesive can be used. Suitable adhesives are, inter alia, glue on the basis of starch or modified starch like for example methyl cellulose or carboxylated methyl cellulose and adhesively acting polymers on the basis of synthetic resins, caoutchouc, polypropylene, polyisobutylene, polyurethane, polyacrylates, polyvinylacetate or polyvinyl alcohol. Such adhesives can also contain dyes in order to improve the optical appearance of the finished products. Frequently, water based glues are used for laminating together paper layers.

In a preferred embodiment of the method including laminating together the top ply and the further ply by means of an adhesive, the adhesive is supplied to the protruding parts of the embossing roll. This technique for applying the adhesive can be used in combination with all predominantly used manufacturing techniques like the Goffra Incolla-type processing, a Pin-to-Pin lamination of two plies and a embossing device in which two plies are combined using a Nested-method. In an attempt to influence the mechanical behaviour of the multi-ply fibrous product, the adhesive can be applied selectively on specific protrusions of the embossing roll. In other words, the adhesive is not applied to all protrusions but only in selected sections of the embossing roll so that the overall ratio of the surface area in which adhesive has been applied relative to the overall surface area can be varied within a broad range.

According to a preferred embodiment of the inventive method, the method further comprises the application of coloured adhesive or non-adhesive coloured substances in order to apply colour to the top ply, preferably on its side which is directed to the at least one further ply in a finished product. This method step further increases the high variability of possible visual effects achieved in a multi-ply product. It is possible to freely combine the application of coloured substances leading to a printed surfaces and/or the application of coloured adhesive to the three-dimensionally embossed ply. Preferably, such coloured substances are applied such that they are directed to the inside of a multi-ply product such that the coloured substances just shimmer through top and/or bottom ply to produce an optical appealing effect.

According to a further preferred embodiment of the invention, the inventive method further comprises the step of pre-embossing the further ply before directing it into the nip between the embossing roll and the marrying roll. Such pre-embossing step mainly serves to produce micro protrusions leading to a background pattern on the further ply of the multi-ply fibrous product. Micro embossing elements have a density of more than 20/cm$^2$, whereas embossing elements arranged in a density of less than 20/cm$^2$ are defined herein as macro-protrusions.

As regards the temperature at which the process is carried out, it is possible either to use room temperature or using heat embossing. The use of heat embossing technique serves to realize geometries which are complex, and therefore, difficult to realize for a given fibrous product especially for non-woven products or hybrid products. In other words, the application of heat might be beneficial to realize highly complex embossing geometries in the inventive product. Further, heat embossing may increase the stability of the embossed geometry.

Preferably, the embossing is carried out in the nip between the embossing roll and an anvil roll. However, according to an alternative preferred embodiment, the embossing can also be performed using an ultrasonic embossing technique.

According to a preferred embodiment of the invention, the top ply and the at least one further ply a brought together in a Pin-to-Pin arrangement. In other words, the at least one further ply is also embossed using a similar or identical three-dimensional embossing roll such that embossed depressions of the top ply and the at least one further ply which contact each other can be laminated together Pin-to-Pin. This implies that the embossing rolls for the top ply and the at least one further ply are operated in register in order to produce a well-defined and reproducible effect.

Alternatively, in a preferred embodiment of the method the top ply and least one further ply are brought together such that they assume a nested arrangement. This again makes it necessary that the embossing rolls for the top ply and the at least one further ply are operated in register such as to realize a well defined nested arrangement of the plies once brought together.

According to a preferred embodiment of the inventive method, the multi-ply product has three plies wherein the top ply and the bottom ply are embossed using an inventive embossing roll, whereas the middle ply is volume embossed. The technique of volume embossing of conventional products is known from WO2002/103112, the teaching of which is incorporated herein by reference. A volume embossed middle ply serves to impart a high volume to the product and might be useful if a product with the feeling of a high volume is desired.

The inventive device for producing fibrous products comprises an inventive embossing roll and a cooperating anvil roll. The anvil roll is preferably made of rubber like EPDM or NBR (nitrylbutadien rubber), paper or steel.

According to a preferred embodiment of the invention, the anvil roll has a hardness between 20 Shore A and 85 Shore A, preferably between 35 Shore A and 60 Shore A and most preferably a hardness of about 45 Shore A.

A preferred device comprises a pre-embossing device for the at least one further ply forming the backside ply. Such pre-embossing is carried out before the further ply is directed into the nip between the embossing roll and the marrying roll.

The device according to the invention can further comprise a device close to the embossing roll for applying adhesive to the top ply. Such device for applying adhesive is arranged such that the top ply being processed can be arranged around the embossing roll and being in contact to a conventional device for applying adhesive to the side of the top ply not being in contact with the embossing roll.

The device preferably comprises a marrying roll running against the embossing roll for bonding together the at least one top ply and at least one further ply. Such marrying roll is used in the conventional Goffra Incolla type process and for an embossing machine providing a nested arrangement of two embossed plies. However, a marrying roll is not necessary in case of a direct bonding together of two embossed plies using the above-described Pin-to-Pin ply bonding in which the tips of the embossing patterns of two plies face each other and are laminated together at such tips. In such a case, the device preferably comprises a further embossing roll running against the inventive embossing roll for embossing at least one further ply. This further embossing roll might be also an inventive embossing roll. However, it is also possible to use a conventional embossing roll which applies conventional embossing elements to the backside ply such that in selected positions relative to the inventive embossing roll processing the top ply, the tips of the embossing elements generated with both embossing rolls face each other in order to achieve a Pin-to-Pin arrangement and bonding of the two plies.

According to a preferred embodiment of the invention, the embossing pattern of the fibrous product, which can also be a single ply product, has the further characteristics that selected embossed protrusions or embossed depressions have a different ratio between height in a direction perpendicular to the base plane and the opening area in the base plane. To provide such differing opening ratios further increases the options to provide recognizably different geometries for individual embossed elements (embossed protrusions or embossed depressions). However, there are technical constraints with regard to the free selection of the opening ratios, because depending on the material properties of the paper product, the production device and the process conditions, the paper product will only be able to adopt the shape of such embossing protrusions or embossing depressions which it is able to follow in shape.

Preferably, the at least one ply of the fibrous product has at least one further base plane at which such selected embossed protrusions or embossed depressions extend from. In other words, the embossed geometries need not necessarily start from the same base plane. Instead, the freely shaped three-dimensional geometry might have e.g. large embossed protrusions which are internally structured by intermediate sections of lower heights which subdivide one big protrusion into a plurality of individual subunits.

Preferably, the fibrous product further comprises at least one further ply forming the backside ply. Such backside ply might remain unembossed or, alternatively could have an embossing patterns as well or, as a further alternative, have the same embossing pattern as the top ply. The definition which of the plies is the top ply and which one is the backside ply is arbitrary. However, for easier understanding, the at least one ply with the three-dimensional embossing and being specially optically appealing is considered to be the top ply of the fibrous product, whereas the at least one further ply forms a backside ply. However, it is possible that the top ply or top plies are embossed together in one nip and the backside ply or plies are also embossed together in another nip. Further, the product can also have one or more middle plies embossed separately from the top ply or plies and the backside ply or plies.

In case that the backside ply is unembossed, such a product is easy to manufacture because the unembossed backside ply can be directly transferred to marrying unit where it is bonded to the top ply.

According to a preferred embodiment, the backside ply is embossed with a second embossing pattern different to the embossing pattern of the top ply, the second embossing pattern preferably comprising a micro embossing pattern. A micro embossing pattern is a relatively regular pattern of densely arranged small embossed protrusions. A density of embossed elements of more than 20/cm$^2$ is defined herein as a micro embossing pattern. Such a micro embossing pattern can be selected freely based on functional criteria in order to give the paper product certain characteristics in term of overall strength, bulk or smoothness. Optical requirements and effects do not play any decisive roll when selecting a suitable micro embossing pattern.

Preferably, the plurality of plies are adhesively bonded together, preferably using a coloured adhesive. The use of an adhesive is another means to influence the technical properties of the combined product, especially the overall stiffness of the fibrous product. If coloured adhesives are used, this is selected in order to give a specific optical appearance to the product. According to a preferred embodiment, the fraction of the surface area between the plies which is covered with an adhesive is more than 5% and less than 80%, preferably between 15% and 60% especially between 20% and 50%. For standard multi-ply paper products with a nested arrangement of at least two embossed plies, the fraction of the surface area covered with adhesive is conventionally between 3% and 8%. From this comparison to conventionally used surface area fractions covered with adhesive, it follows that the inventive product might have a much larger proportion of the overall area covered with adhesive. Such a high surface area which is preferably between 15% and 60% results in a stiff product which can be especially useful for napkins.

In order to combine a plurality of plies and specially two plies together, the plies are preferably adhesively bonded together at the tips of the embossing patterns of the plies facing each other.

In another preferred embodiment of the invention, the multi-ply fibrous product comprises at least one middle ply which is volume embossed. The technique of volume embossing of conventional products in known from WO2002/103112 the teaching of which is incorporated herein by reference. A volume embossed middle ply serves to impart a high volume to the product and might be used if a product with the feeling of a high volume is desired.

According to a preferred embodiment, the fibrous product comprises four plies, at least one middle ply being embossed together with the adjacent top ply.

According to a preferred embodiment of the invention, the top ply of a fibrous product has an embodying pattern with embossed cushion-like protrusions whereas the bottom ply has embossed stabilizing elements which project into the cushion-like protrusions of the top ply. Such a structure has the advantage that relatively large dimensioned cushion-like protrusions can be provided which are stabilized by the stabilizing elements of the backside ply or bottom ply. For a more detailed description of the concept of providing stabilizing elements, reference is made to WO2006/136186 the teaching of which is incorporated herein by reference. The embossed stabilizing elements support the three-dimensional structure of the top ply and avoid collapsing of the cushion-like protrusions.

Preferably, at least one ply of a multi-ply fibrous product has a colour which is different to the colour of the other ply or plies. The provision of a selected ply having a different base colour can further be used to improve the optical appearance of multi-ply fibrous product.

DESCRIPTION OF PREFERRED EMBODIMENTS

Figure 1:
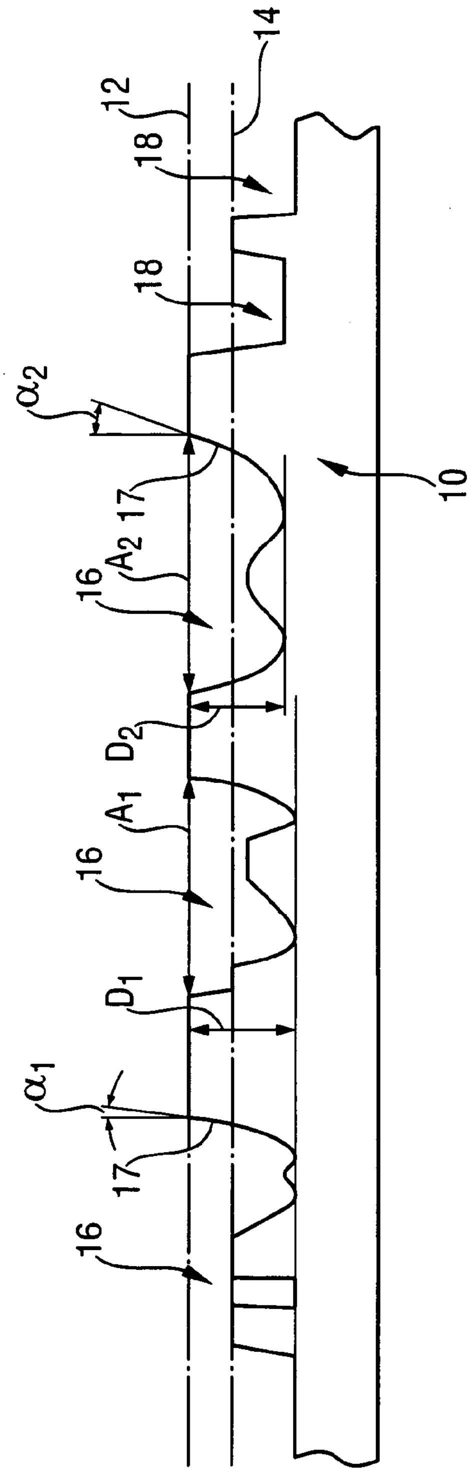
FIG. 1 schematically shows a section of the circumferential surface of an inventive, structurized embossing roll for producing the inventive paper product.

FIG. 1 is a schematic view which shows only a small portion of the circumferential portion of an embossing roll for producing the inventive paper product. The embossing roll is preferably made of steel, very hard plastics, a resin or a hard rubber and is generally designated by reference numeral 10. In the specific embodiment as shown in FIG. 1, the embossing roll 10 has a female embossing geometry which means that, starting from a base circumferential surface 12 indicated by a dashed line, there are female depressions on the outer circumferential surface of the roll. Indicated by a double-dot-dashed line 14, a further base circumferential surface 14 can be defined on the embossing roll. Besides the main depressions 16 extending from the base circumferential surface 12, there are also further, smaller depressions 18 starting from the further circumferential base surface 14 and having a smaller depth than the main depressions 16.

From a comparison of the maximum depth D1 and D2 of two exemplary depressions in the roll 10 it follows that the depressions might have different depths. From the cross-sectional view as shown in FIG. 1, the extension of the depressions in a direction perpendicular to the plane of the drawing and within the base surface 12 cannot be judged. Same applies to the overall dimensions of the areas A as indicated exemplary as A1 and A2 in FIG. 1. However, it is to be noted that the ratio between the depths D and the corresponding opening area A of a female depression can vary between the individual depressions 16, as well as between the individual depressions 18 starting from the second base circumferential surface 14.

In FIG. 1 selected angles ($\alpha$1, $\alpha$2) between side wall sections 17 of male protrusions or female depressions 16 and the adjacent base are different.

FIG. 1 also shows that the slope angles between parts of the side wall sections 17 of the depressions 16 and the direction perpendicular to the base circumferential surface 12, i.e. the radial direction of the roll 10 have different and freely selected values.

The exemplary surface pattern of the roll 10 can be obtained by any known method like machining, etching, masking-etching and moletage or suitable combinations or these methods. The schematic view according to FIG. 1 intends to show that the embossing surface is of a freely selected shape without constraints as regard a geometric similarity between different embossing depressions 16 or 18. The sizes, slopes of the side walls, definition of base circumferential surfaces and the areas of the openings at any such defined base surface can be freely selected as long as the geometry allows the material to be embossed to substantially follow the shape of the embossing surface of the roll.

Figure 2:
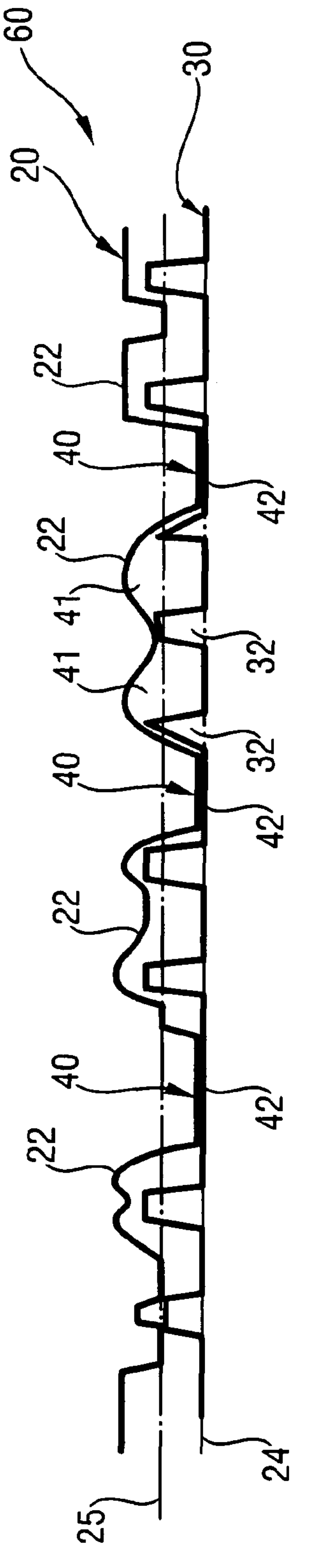
FIG. 2 schematically shows a two ply inventive product, one of its plies being embossed using the embossing roll as schematically shown in FIG. 1.

FIG. 2 shows a cross-sectional view of an inventive product 60, exemplified as a two-ply product consisting of a first ply 20 and a second ply 30. The first ply 20 is the top ply and was produced using the inventive 3D-embossing technique using an embossing roll 10 as shown in FIG. 1. The second bottom ply 30 is provided with a micro-embossing pattern with a higher density of embossed geometries compared to the top ply 20. Micro-embossing patterns have a density of the embossing elements exceeding 20/cm$^2$.

The top ply 20 is 3D-embossed forming embossed cushion-like protrusions 22, whereas the micro-embossed protrusions of the backside ply 30 are denoted with reference numeral 32. From the schematic drawing of FIG. 2 it can be seen that several micro-embossed protrusions 32 extend into the embossed cushion-like protrusions 22 of the top ply 20 and stabilize them so that they support the cushion-like protrusions and avoid their collapsing.

In the areas 40, the two plies are bonded together by means of adhesive 42 which is locally applied to the base plane 24 of the first ply corresponding to the base circumferential surface 12 of the roll 10 as shown in FIG. 1.

In the top ply 20, a further base plane corresponding to the further base surface 14 on the roll 10 can be defined which corresponds to the further base circumferential surface 14 of the roll 10 as shown in FIG. 1 and subdivides the cushion-like protrusions into secondary cushion-like protrusions 41.

The second ply 30 is flattened by the marrying process in those areas in which the first ply 20 and the second ply 30 are adhesively bonded together. In order to increase the visual effect, the adhesive 42 can be coloured.

Figure 3:
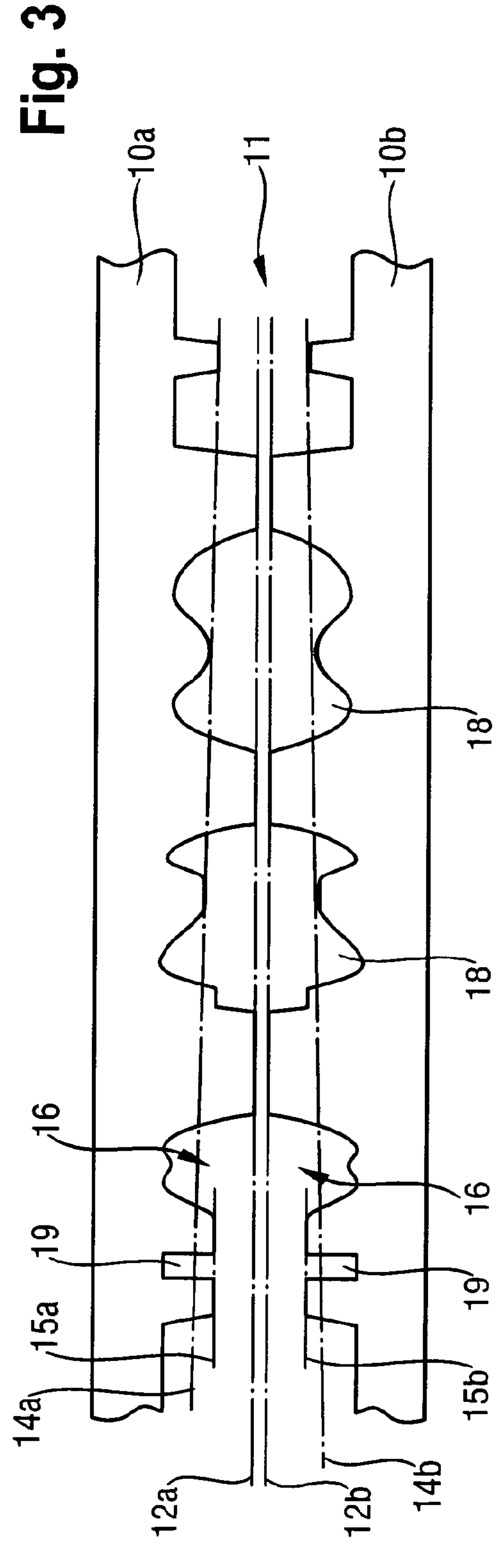
FIG. 3 schematically shows the nip between two inventive, structurized embossing rolls to be used in an embossing machine of the Pin-to-Pin type.

FIG. 3 schematically shows the nip 11 between two inventive, structurized embossing rolls 10*a* and 10*b* to be used in an embossing machine and process of the Pin-to-Pin type. To this end, the two 3D-embossing rolls 10*a* and 10*b* have a surface topography which is a mirror image of each other. In fact, in order to achieve an arrangement of two plies in the Pin-to-Pin mode, it is not necessary that the embossing surface of the two cooperating embossing rolls is identical in terms of a mirror image. It is sufficient that selected raised portions in the embossing geometry of the two cooperating rolls face each other. In the example shown in FIG. 3, both rolls 10*a* and 10*b* are provided with female depressions 16, but there can be defined some additional circumferential surfaces 14 as well as 15 defining additional surfaces and forming the starting point for further female depressions 18 and 19 extending from planes 14 and 15, respectively. The nip, i.e. distance between the two base circumferential planes 12*a*, 12*b* is adjusted according to the thickness of the fibrous product processed and possible additional layers forming one or more middle plies.

Figure 4:
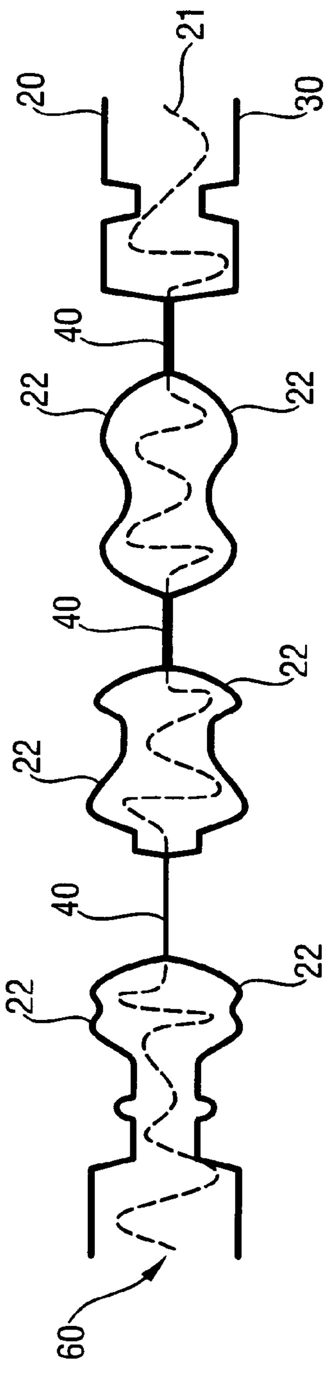
FIG. 4 shows a cross section of an example product using the embossing rolls as schematically shown in FIG. 3.

FIG. 4 shows an example of a multi-ply product formed by means of the pair of rolls as schematically shown in FIG. 3. The first ply 20 and the second ply 30 follow the shape of the embossing rolls 10*a*, 10*b*, the above described loss between the geometry of the embossing roll and the geometry of the embossed fibrous product not being considered here. Such a loss results in a slightly reduced height of the embossing elements within the resembling product compared with the heights of the embossing elements at the embossing roll. As can be seen, there is a third ply 21 which is volume embossed. Volume embossed means that the third ply 21 receives an irregular embossing pattern which is not in register to the embossing pattern of the first ply 20 and second ply 30. The effect of the volume embossed middle ply 20 is to stabilize the embossed protrusions 22 of the first and second plies 20, 30. A product as shown in FIG. 4 is manufactured by separately volume embossing the middle ply 21 and then directing the middle ply into the nip 11 between the embossing rolls 10*a* and 10*b* as shown in FIG. 3. In the nip 11 between those parts of the embossing rolls lying in the base circumferential planes 12*a*, 12*b* and facing each other, the three plies are ply bonded together using an adhesive applied to ply 20 and/or ply 30 in the course of their individual embossing steps but before being directed into the nip 11 between the two embossing rolls as shown in FIG. 3.

As an alternative to the arrangement of embossing rolls and the product as shown in FIGS. 3 and 4, there might be more than one volume embossed middle ply or a middle ply which is not embossed. Further, the geometry of the two embossing rolls 10*a*, 10*b* might be different, the embossing surface of both rolls not being a mirror image to each other. This is possible as long as the two rolls are operated in a coordinated manner and there are well defined portions of both rolls in which ply bonding is generated in the nip 11 between both embossing rolls 10*a*, 10*b*.

Figure 5:
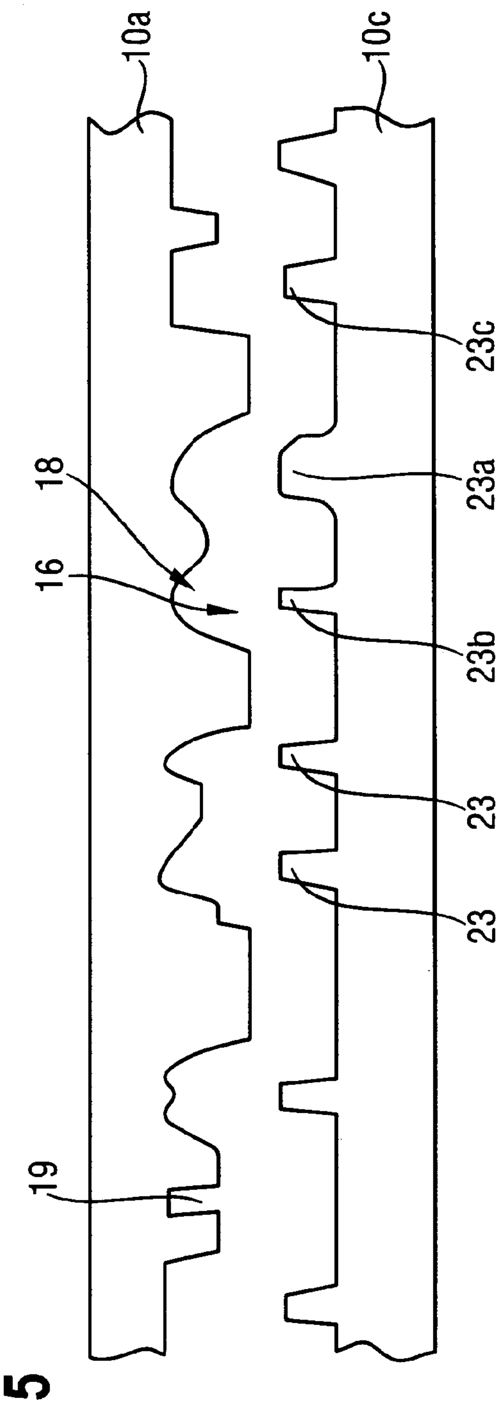
FIG. 5 schematically shows the nip between two inventive, structurized embossing rolls to be used in an embossing machine of the Nested type.
Figure 6:
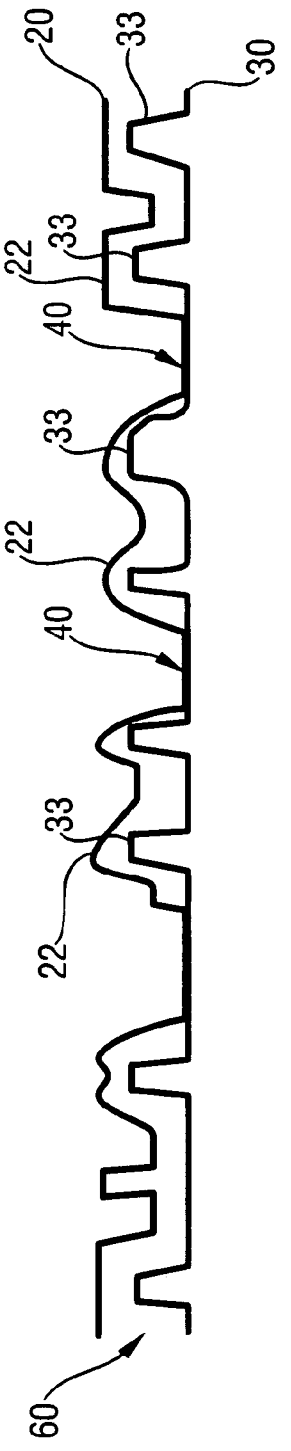
FIG. 6 shows a cross section of an example product using the embossing rolls as schematically shown in FIG. 5.

The embodiment according to FIG. 5 and the product resulting therefrom as shown in FIG. 6 are different in that two embossing rolls 10*a*, 10*c* are used which have a different shape and are arranged such that the plies embossed separately on rolls 10*a* and 10*c* can be combined together in a further process step to achieve a nested arrangement of the plies.

Embossing roll 10*a* is identical to embossing roll 10*a* according to FIG. 3 so that for any further explanations reference can be made to the description of FIG. 3. The embossing roll 10*c* is provided with discrete protrusions 23 which can have either an identical shape or a different shape as in the example of embossing roll 10*c* in which there is a difference between different types of protrusions 23*a*, 23*b* and 23*c* . . . . The process using the embossing rolls 10*a* and 10*c* will be described later with reference to FIG. 10.

When combining together two plies 20 and 30 as produced separately on the embossing rolls 10*a*, 10*c* and combining together the two plies 20 and 30 between the first embossing roll 10*a* and the marrying roll, a product as schematically shown in FIG. 6 is obtained. The bottom ply 30 is provided with protrusions 33 which project into the embossed protrusions 22 of the first ply 20 and provide a stabilizing effect of the protrusions 22 of first ply 20. This is advantageous because, embossing roll 10*a* according to the invention provides a freely designed three-dimensional surface so that complex shapes and large size embossed depressions or embossed protrusions might be formed which keep their shape in a more stable way if the bottom ply is provided with support embossments 33 as schematically indicated in FIG. 6.

Figure 7:
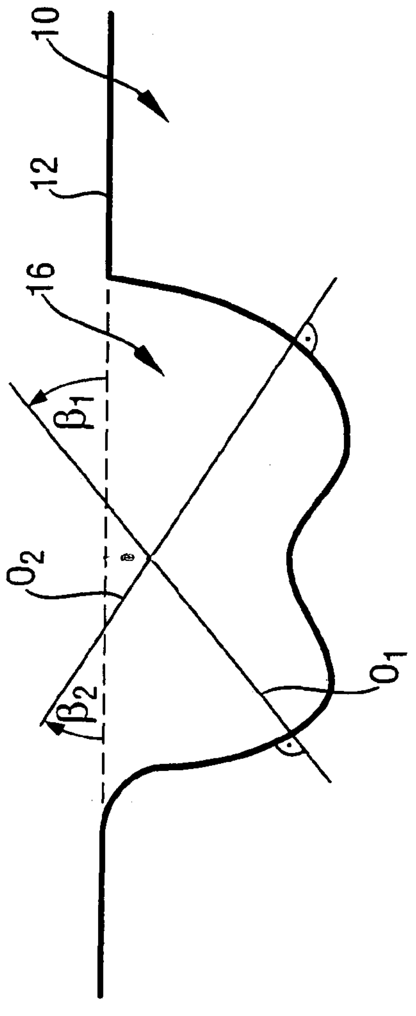
FIG. 7 schematically shows a curved female depression in the circumferential base surface of an embossing roll.

FIG. 7 schematically shows another characteristics of the inventive embossing roll. It shows a small section of the base circumferential surface of a roll 10 with a female depression 16 formed therein. The female depression has curved side walls in the cross-sectional view as shown in FIG. 7. What is meant by curved side walls are not only small rounded sections in the transition between the base circumferential surface and conventional embossing depressions but a curvature which may extend over a considerable part of or all over the sidewalls. In FIG. 7 there are shown two fictitious orthogonal lines starting from the curved surface of the female depression. Both orthogonal lines cross the base circumferential surface in an angle indicated by $\beta_1$ and $\beta_2$ which is defined as the smallest angle which exists between the orthogonal directions $O_1$ and $O_2$ and the base circumferential surface 12 of the embossing roll 10. It can be seen that two orthogonal directions can be defined both of which start from selected positions of the curved local surface of the female depression such that the two orthogonal directions cross the base circumferential surface at angles satisfying the equation $30° < |\beta_1 - \beta_2| < 90°$ and preferably $50° < |\beta_1 - \beta_2| < 90°$. Here, it should be noted that the angles $\beta_1$ and $\beta_2$ have a different direction leading to a different mathematical algebraic sign.

Figure 8:
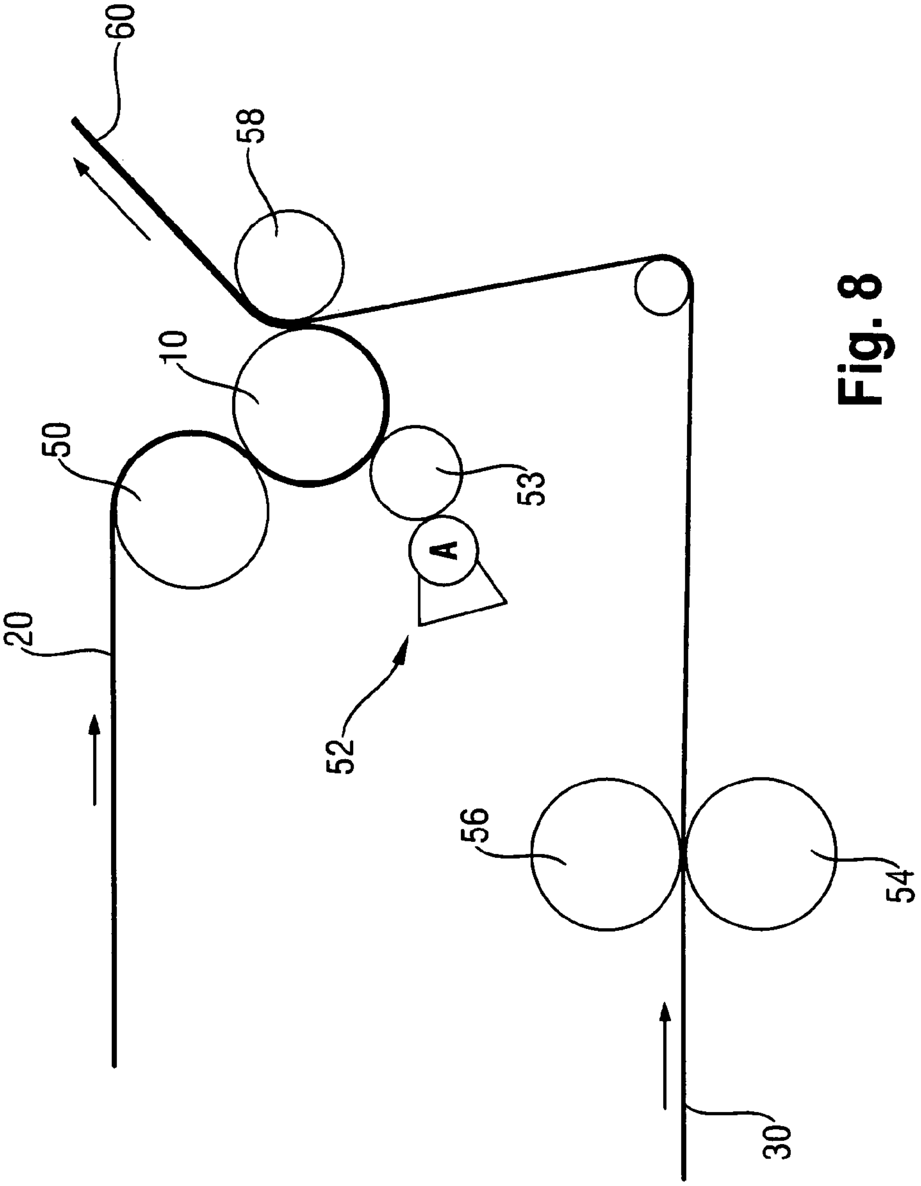
FIG. 8 shows an example of the production device and process of an inventive two ply product using an embossing machine of the Goffra Incolla type.

FIG. 8 shows a first embodiment for providing a two-ply product according to the invention using the Goffra Incolla technology. In the example as shown in FIG. 8, the first ply 20 is 3D-embossed between an anvil roll 50 and an inventive embossing roll 10 as exemplified in FIG. 1. Adhesive is applied to the base surface 12 of the three dimensional embossing roll 10 (if the three dimensional embossing roll is provided with female depressions as shown in FIG. 1) or is applied to the top surfaces of male embossing protrusions, if the 3D-roll has male projections on its circumferential surface. Adhesive is applied by means of an application device 52 comprising an application roll 53. The second ply 30 can be optionally pre-embossed between a micro-embossing roll 54 and a corresponding anvil roll 56 and is subsequently fed to the marrying station between the three dimensional embossing roll 10 and a marrying roll 58 as is conventionally used in the art. The two-ply laminated product 60 corresponding to that as shown in FIG. 2 leaves the schematic device as shown in FIG. 8.

Figure 9A:
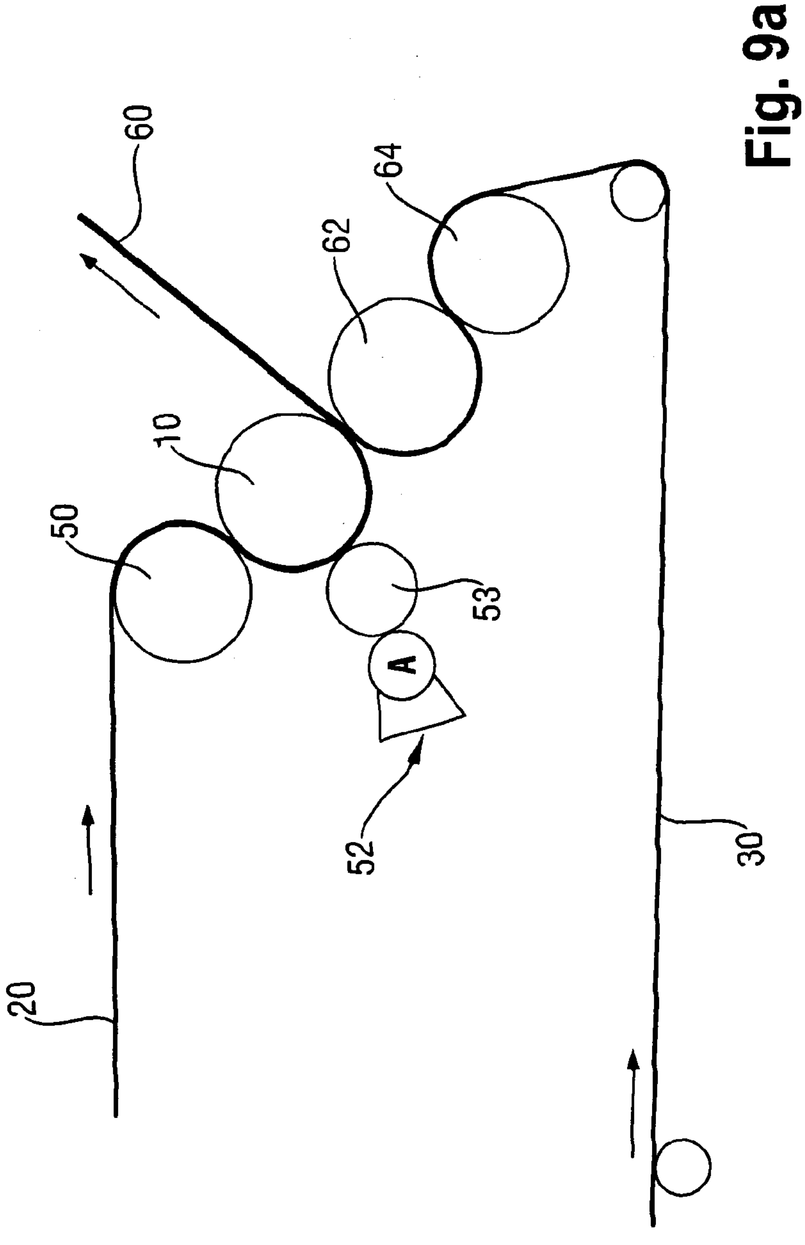
FIG. 9*a* shows another example of a production device and process of an inventive two-ply product using an embossing machine of the Pin-to-Pin type.

An alternative embossing device and method in the Pin-to-Pin type is schematically shown in FIG. 9*a*. The first ply 20 is three dimensionally embossed between the inventive 3D-embossing roll 10 and the anvil roll 50 and an adhesive is applied by an application device 52 comprising an application roll 53. The second ply 30 is also provided with a three dimensional embossing pattern between a further inventive 3D-embossing roll 62 and a corresponding anvil roll 64. The second three dimensional embossing roll can be of the same type as roll 10, i.e. both rolls can be provided with male protrusions and/or female depressions or can be of the other type so that one of the rolls 10, 62 has female depressions and the other roll has male protrusions. The two plies 20 and 30 are combined together in the nip between the two embossing rolls 10 and 62 leading to a two-ply laminated product 60. The type of embossing device and method as shown in FIG. 9*a* can be of the type as shown in FIG. 3 above.

Figure 9B:
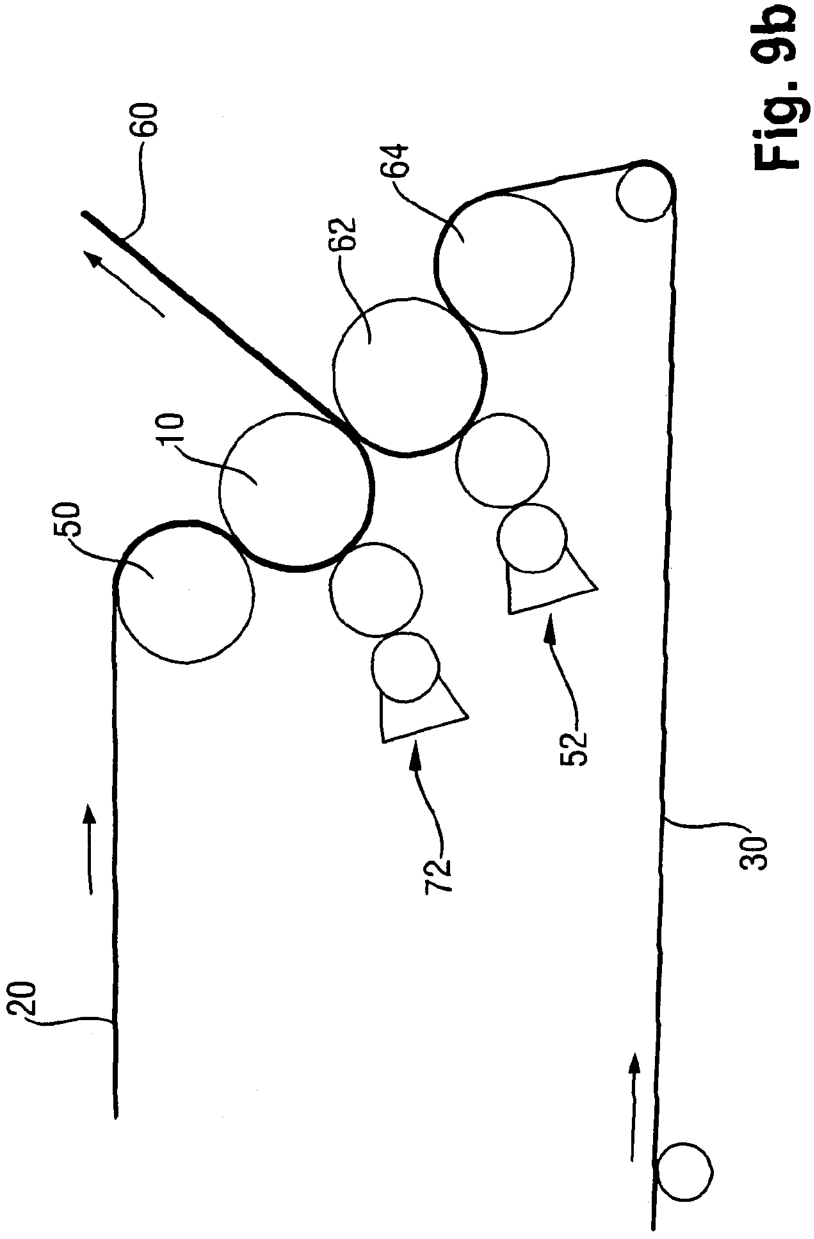
FIG. 9*b* shows a further example of a production device and process of an inventive two-ply product using an embossing machine of the Pin-to-Pin type and comprising an ink application device as well as an application device for adhesives.

FIG. 9*b* shows an embossing device and a method of the Pin-to-Pin type identical with FIG. 9*a* with the exception that the adhesive application device 52 is connected with 3D-embossing roll 62 instead of roll 10 and that an additional color (ink) application device 72 is connected with 3D-embossing roll 10.

Figure 10:
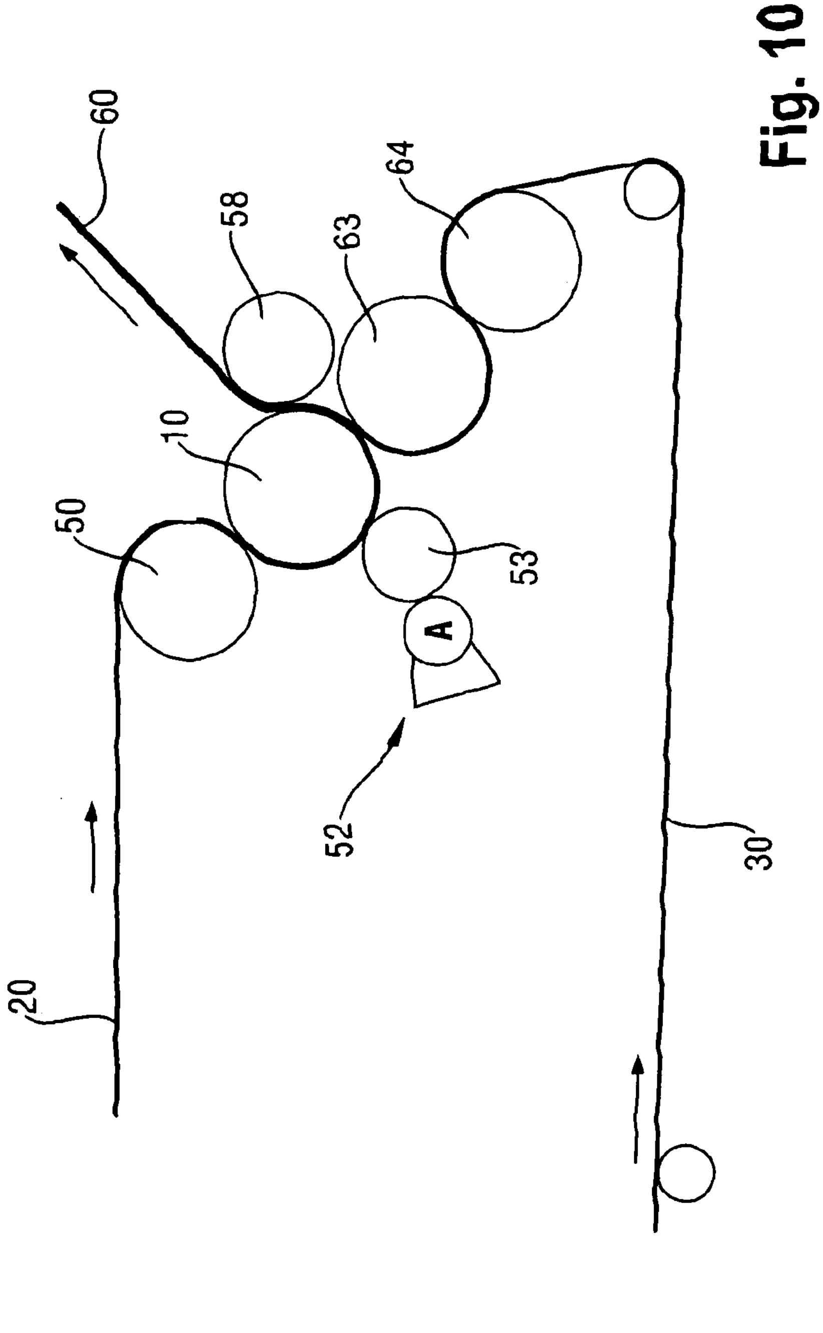
FIG. 10 shows another example of a production device and process of an inventive two-ply product using an embossing machine of the Nested type.
Figure 11A:
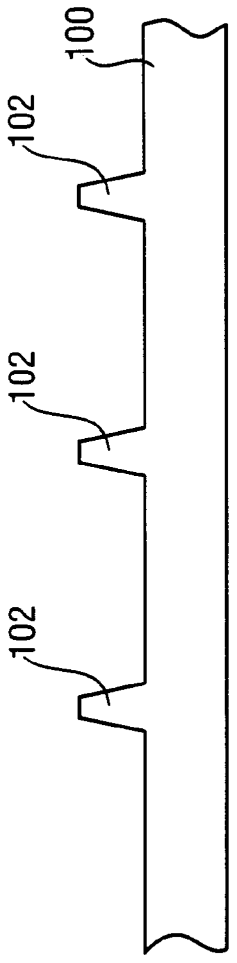
FIG. 11*a* is a schematic view of part of a conventional embossing roll with single height male protrusions.
Figure 11B:
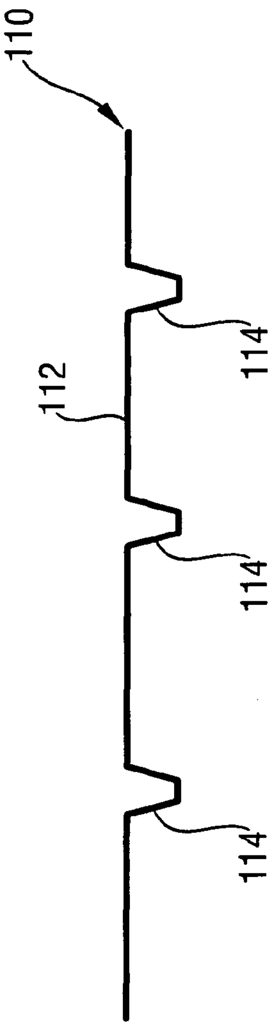
FIG. 11*b* is a schematic view of a product embossed with a single height embossing roll according to FIG. 11*a;*
Figure 12A:
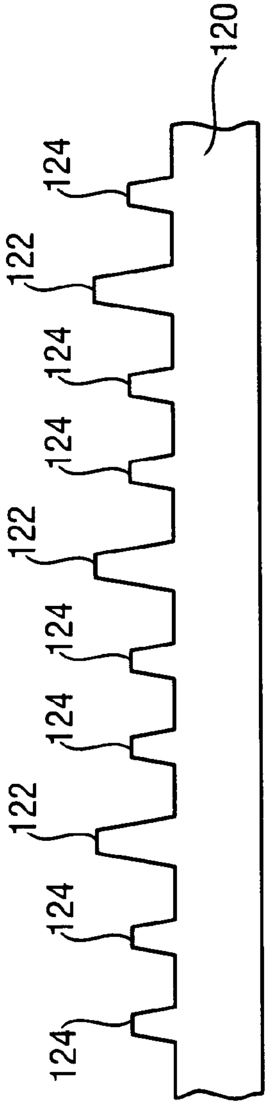
FIG. 12*a* is a schematic view of a part of the circumferential surface of a conventional double height embossing roll.
Figure 12B:
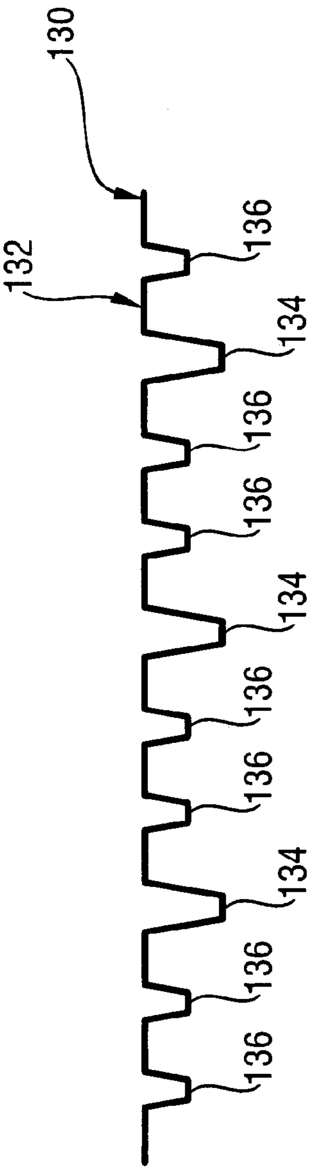
FIG. 12*b* is a product embossed with a conventional double height embossing roll according to FIG. 11*b*.

FIG. 10 shows a further alternative embossing device and method of the Nested type. The first ply 20 is three-dimensionally embossed between the inventive 3D-embossing roll 10 and the anvil roll 50 and an adhesive is applied by conventional applicator device 52 comprising an application roll 53. The processing of the first ply 20, therefore, is identical to that as described above with reference to FIGS. 8, 9*a* and 9*b*. At least one further ply 30 is provided with an embossing pattern between an embossing roll 63 which can either be an inventive 3D-embossing roll or a conventional embossing roll. The second ply 30 is embossed between roll 63 and anvil roll 64 before it is directed into the nip between the 3D-embossing roll 10 for the first ply and a marrying roll 58 cooperating with the 3D-embossing roll 10 for the first ply. Embossing rolls 10 and 63 are operated in register so that a nested arrangement as schematically shown in FIG. 6 can be realized. The embossing roll 63 for the at least one further ply 30 can be of the type as exemplified by the embossing roll 10*c* in FIG. 5, but any other geometry leading to a nested arrangement of the embossed elements of the second ply 30 in the embossed elements of the first ply 20 is possible to achieve the desired result.

The inventive embossing roll in combination with the three dimensional embossing method and device makes it possible to produce fibrous products which have a much higher versatility of embossing patterns compared to conventional fibrous products. There are nearly no more constraints as regards the geometry of individual embossing patterns except the need for a suitable fibrous product to follow the shape of the 3D-embossing rolls in the course of the production method.

The invention claimed is:

1. A fibrous product selected from the group consisting of tissue paper product, non-woven product or a hybrid thereof, and hygiene and cleaning product, with at least one ply with an embossing pattern comprising embossed depressions, or embossed protrusions, the embossed depressions or embossed protrusions starting from a base plane of the ply;

the embossing pattern having the following features:

base areas of a plurality of embossed depressions or embossed protrusions, in the base plane are different;

depths of the plurality of embossed depressions or the heights of the plurality of embossed protrusions perpendicular to the base plane are different;

angles between sidewall sections and an adjacent base plane of selected embossed depressions or embossed protrusions are different;

at least one male protrusion or female depression have sidewalls with at least two different slope angles between sidewall sections and the adjacent base surface; and a plurality of angles between side wall sections of male protrusions or female depressions and a normal to the adjacent base surface exceed 30°.

2. The fibrous product according to claim 1, wherein the embossing pattern has the following characteristics:

selected embossed protrusions or embossed depressions have a different ratio between height or depth in a direction perpendicular to the base plane and the opening area in the base plane.

3. The fibrous product according to claim 1, wherein the at least one ply has at least one further base plane at which selected embossed protrusions or embossed depressions extend therefrom.

4. The fibrous product according to claim 1, further comprising at least one further ply forming a backside ply wherein the backside ply may be unembossed or wherein the backside ply either has the same embossing pattern as a top ply or is embossed with a second embossing pattern different to the embossing pattern of the top ply, the second embossing pattern comprising a micro embossing pattern.

5. The fibrous product according to claim 1, wherein a plurality of plies are adhesively bonded together using a coloured adhesive whereby the fraction of a surface area covered with adhesives between the plies is more than 5% and less than 80%, wherein the plurality of plies are optionally adhesively bonded together at the tips of the embossed patterns of the plies facing each other and wherein the plies are only partly bonded together.

6. The fibrous product according to claim 2, wherein a top ply has an embossing pattern with embossed cushion-like protrusions; and a bottom ply has embossed stabilizing elements which project into the cushion-like protrusions of the top ply.

7. The fibrous product according to claim 1, wherein angles $\beta_1$, $\beta_2$ being defined as the crossing of orthogonal directions starting from selected positions on a local surface of male protrusions and/or female depressions and the base plane, wherein such angles $\beta_1$, $\beta_2$ are greater than 30°, or smaller than 20°.

8. The fibrous product according to claim 1, wherein a local surface of at least one female depression is curved such that two orthogonal directions starting from positions on the local surface can be defined, the two orthogonal directions crossing the base plane at angles $\beta_1$, $\beta_2$ satisfying the equation $30° < |\beta_1 - \beta_2| < 90°$.

* * * * *